United States Patent Office 3,539,463
Patented Nov. 10, 1970

3,539,463
SOLID SEQUESTERING AGENT COMPRISING A BORATE AND SODIUM β-GLUCOHEPTONATE
James L. Harper, Laurel, Md., and Jon C. Thunberg, Amherst, N.H., assignors to W. R. Grace & Co., New York, N.Y., a corporation of Connecticut
No Drawing. Filed Sept. 7, 1967, Ser. No. 665,982
Int. Cl. C02b 5/02; C07c 69/34; C11d 7/02
U.S. Cl. 252—181
10 Claims

ABSTRACT OF THE DISCLOSURE

This invention is directed to a composition of matter useful as a sequestering agent, said composition consisting essentially of about 30–100 mole percent borate esters of sodium β-glucoheptonate and about 0–70 mole percent sodium β-glucoheptonate and to a method for preparing such composition, all as recited hereinafter.

---

This invention is in the field of sodium β-glucoheptonate and borate esters thereof.

Aqueous solutions of mixtures of sodium α-glucoheptonate and sodium β-glucoheptonate are well known in the art, being articles of commerce. These solutions are generally made from glucose by the general procedure of the Kiliani synthesis in which glucose is treated with cyanide (e.g., HCN, NaCN, or KCN) and the resulting nitrile is hydrolyzed. For example, the addition of hydrogen cyanide to an aqueous solution of D-glucose produces a mixture of two epimeric nitriles (I and II) because, in this reaction, a new asymmetric carbon atom is added to the glucose chain:

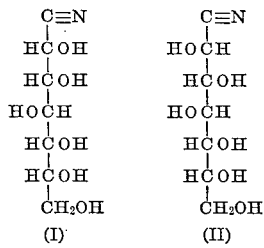

Alkaline hydrolysis (e.g., with sodium hydroxide) of the thus formed solution produces a solution comprising a mixture of salts of two epimeric monobasic (monoprotic) acids:

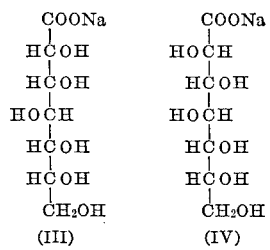

Formula III, supra, is the formula of sodium α-glucoheptonate (sodium D-glycero-β-D-gulo-heptonate), and Formula IV, supra, is the formula of sodium β-glucoheptonate (sodium D-glycero-D-ido-heptonate).

In summary, this invention is directed to a substantially dry, free-flowing, particulate solid composition useful as a sequestering agent, said composition consisting essentially of 30–100 mole percent borate esters of sodium β-glucoheptonate and 0–70 mole percent sodium β-glucoheptonate, the sodium β-glucoheptonate plus the borate esters of sodium β-glucoheptonate totaling 100 mole percent.

This invention is also directed to a process for preparing said composition, said process comprising; adding a borate source selected from the group consisting of boric acid, sodium tetraborate, sodium metaborate, and mixtures of at least two members of said group to an aqueous solution having a solid content of about 30–70% by weight, said solid consisting essentially of sodium β-glucoheptonate, said borate source being added at the rate of about 1.62–10.8 grams of boron (preferably about 4–6 grams of boron), calculated as B, per gram mole of said sodium β-glucoheptonate, evaporating the thus treated solution substantially to dryness, and recovering the substantially dry, free-flowing, particulate solid product.

A preferred embodiment for preparing said composition comprises:

(a) Preparing a first aqueous solution, said first aqueous solution having a first solid content of about 30–70% by weight, said first solid consisting essentially of about 30–100 mole percent borate esters of sodium β-glucoheptonate and about 0–70 mole percent sodium β-glucoheptonate, the sodium β-glucoheptonate plus the borate esters of sodium glucoheptonate totaling 100 mole percent, by adding a borate source selected from the group consisting of boric acid, sodium tetraborate, sodium metaborate, and mixtures of at least 2 members of said group to a second aqueous solution, said second aqueous solution having a second solid content of about 20–60% by weight, said second solid consisting essentially of sodium β-glucoheptonate while agitating said second solution and maintaining the temperature thereof within the range of about 20–100° C., said borate source being added at a rate to provide about 1.62–10.8 grams of boron, calculated as B, per gram mole of sodium β-glucoheptonate present in the second aqueous solution, thereby to form a third aqueous solution of a third solid, said third solid consisting essentially of about 30–100 mole percent borate esters of sodium β-glucoheptonate and about 0–70 mole percent of sodium β-glucoheptonate, the sodium β-glucoheptonate plus the borate esters of sodium β-glucoheptonate totaling 100 mole percent, and adjusting the solid content of said third aqueous solution to about 30–70% by weight, thereby to form said first aqueous solution;

(b) Precipitating a solid product by evaporating the aforesaid first aqueous solution substantially to dryness; and (c) Recovering the thus formed solid product, said product being a substantially dry, free-flowing, particulate solid composition, useful as a sequestering agent, and consisting essentially of about 30–100 mole percent borate esters of sodium β-glucoheptonate and 0–70 mole percent sodium β-glucoheptonate.

In especially preferred (or optimum) embodiments of the above preferred embodiment:

(1) The borate source is added at a rate to provide about 3.25–9.0 (or 4–6) grams of boron, calculated as B per gram mole of sodium β-glucoheptonate present in the second aqueous solution;

(2) The first aqueous solution is evaporated substantially to dryness by spray drying using an air stream with an inlet temperature of about 150–190° C. and an outlet temperature of about 55–80° C. under a pressure of about 5–15 pounds per square inch absolute;

(4) The first aqueous solution is evaporated substantially to dryness by spray drying using an inlet air temperature of about 170–180° C. and an air outlet temperature of about 60–70° C. under a pressure of about 1 atmosphere; and (5) The first aqueous solution is evaporated substantially to dryness in a rotary dryer by heating to about 90–110° C. under a pressure of about 7–12 pounds per square inch.

Solid sodium α-glucoheptonate, an article of commerce, is prepared by crystallizing said α-glucoheptonate from aqueous solutions of mixtures of sodium α-glucoheptonate and sodium β-glucoheptonate. Such aqueous solutions (mixtures of the α- and β-salts), as noted supra, are generally prepared by procedures based upon the Kiliani synthesis. While sodium α-glucoheptonate is readily crystallized from such solutions, sodium β-glucoheptonate cannot be obtained in crystalline form such solutions by any means known to the art. Evaporating, or concentrating, such solutions, after substantially all of the sodium α-glucoheptonate has been crystallized therefrom, produces a thick viscous syrup, but no crystals of sodium β-glucoheptonate crystallize therefrom. Still further evaporation (substantially to dryness) produces lumps, or chunks, of hygroscopic, amorphous glass-like solid—sodium β-glucoheptonate—which is exceedingly difficult or impossible to handle on a commercial scale.

In consequence of such behavior, aqueous solutions of sodium β-glucoheptonate represent an unwanted or "distress" by-product of the preparation of crystalline sodium α-glucoheptonate. Dilute solutions of sodium β-glucoheptonate which can be pumped can be used as sequestering agents but because of their high water content are expensive to ship.

We have made the surprising and completely unobvious discovery that solutions of sodium β-glucoheptomate can be converted into solutions from which a substantially dry, free-flowing, particulate solid composition useful as a sequestering agent can be obtained by a process comprising converting about 30–100 mole percent (preferably about 35–100 mole percent) of the sodium β-glucoheptonate present in such solutions to borate esters of sodium β-glucoheptonate by treating an aqueous solution of sodium β-glucoheptonate with a borate source—boric acid, sodium tetraborate, sodium metaborate, or mixtures thereof.

The thus formed aqueous solution is then evaporated substantially to dryness—using a spray dryer, a rotary evaporator, or an agitated evaporator, such evaporation being conducted under a pressure of about 1–15 pounds per square inch and a temperature of about 50–115° C. Where using spray drying in a current of hot air, inlet temperatures of about 150–190° C. and air outlet temperatures of about 55–80° C. have given excellent results. Spray drying is generally conducted at atmospheric pressure; however, excellent results have been obtained at reduced pressures, e.g., pressures between 5 pounds per square inch absolute and one atmosphere.

It is believed that the following discussion explains the chemical nature of the borate esters of sodium β-glucoheptonate; however, our invention is completely independent of and in no way dependent upon such theory whether or not the theory should prove correct:

It is believed that an aqueous solution containing the borate and β-glucoheptonate anions would undoubtedly be a complex equilibrium mixture which would contain the following species;

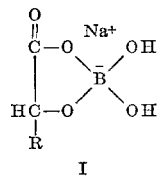
I

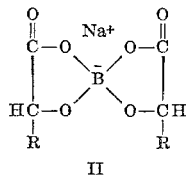
II

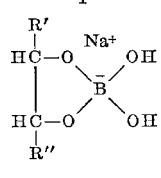
III

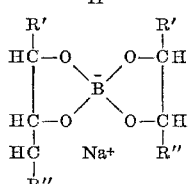
IV wherein R is the β-residue of the sodium glucoheptonate structure and R′ and R″ also portions of β-sodium glucoheptonate residues (one of which contains the carboxyl groups).

Note that structures of the type II and IV could be mixed esters, i.e., V, below:

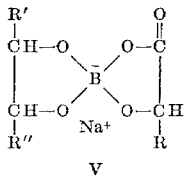
V

The following non-limiting examples illustrate but do not limit the scope of our invention.

EXAMPLE I

To 70.66 kilograms of a first aqueous solution having a solid content of about 40% by weight, said solid consisting essentially of sodium β-glucoheptonate was added 2.95 kilograms of pulverulent boric acid ($H_3BO_3$) while stirring (agitating) said first solution and while maintaining the temperature of said solution withn the range of about 25–50° C. The total solid content of resulting borate-treated solution was about 42.5% by weight. Said solution had a specific gravity of 1.25. Said solution was labeled "Solution A."

EXAMPLE II

A 1 liter portion of the aforesaid Solution A was subjected to spray drying, using conventional apparatus, in an "as received" condition (i.e., the solid content thereof was not adjusted). Inlet air temperature was about 170–180° C. and outlet air temperature was about 62–68° C. The product was a tan, substantially dry, free-flowing, particulate solid substantially all of which passed a 10 mesh U.S. Standard screen. The solid product was readily soluble in water, and an aqueous solution of said solid was an excellent sequestering agent.

EXAMPLE III

The solid content of a portion of Solution A was adjusted to about 30% by weight, by adding water to said Solution A; the resulting 30% solution was labeled "Solution B."

The general procedure of Example II was repeated; however, in this instance a 1.5 liter portion of Solution B was subjected to spray drying. The resulting product was a tan, substantially dry, free-flowing, particulate solid, substantially all of which passed a 10 mesh U.S. Standard screen. The solid product was readily soluble in water, and an aqueous solution of said solid was an excellent sequestering agent.

EXAMPLE IV

The solid content of a portion of Solution A was adjusted to about 60% by weight by evaporating water therefrom; the resulting 60% solution was labeled "Solution C."

The general procedure of Example II was repeated; however, in this instance a 1 liter portion of Solution C was submitted to spray drying. The product obtained was a tan, substantially dry, free-flowing, particulate solid, substantially all of which passed a 10 mesh U.S. Standard screen. The solid product was readily soluble in water, and an aqueous solution of said solid was an excellent sequestering agent.

EXAMPLE V

The general procedure of Example II was repeated, but in this instance about a 21 kilogram portion of Solution A was subjected to spray drying. The solid product obtained was indistinguishable from that obtained in Example II.

EXAMPLE VI

A half-liter portion of Solution A was evaporated substantially to dryness in a rotary evaporator (a Büchi Rotavapor). Said evaporator communicated with a vacuum source (a reduced pressure line) having a pressure of about a pound per square inch absolute. Heat was supplied by immersing about the lower one-half of the rotating liter flask of the Rotavapor in a bath of boiling water. The resulting solid product was a tan-colored granular, free-flowing material substantially all of which passed a 10 mesh U.S. Standard screen. Said solid product was readily soluble in water, and an aqueous solution of said solid was an excellent sequestering agent.

EXAMPLE VII

The general procedure of Example VI was repeated; however, in this instance the procedure was modified by immersing the lower half of the aforesaid rotating flask in a water bath, said bath being maintained at about 60° C. The results of the instant run were indistinguishable from those of Example VI.

EXAMPLE VIII

The general procedure of Example VI was repeated; however, in this instance the procedure was modified by immersing the lower half of the rotating flask in an oil bath, said bath being maintained at about 110–115° C. The results of the instant run were indistinguishable from those of Example VI.

EXAMPLE IX

The general procedure of Example I was repeated; however, in this instance the procedure was modified by adding about 5.9 kilograms of boric acid to 70.66 kilograms of the first aqueous sodium β-glucoheptonate solution. The resulting second aqueous solution having a solid content of about 45% was labeled "Solution D."

EXAMPLE X

The general procedure of Example V was repeated; however, in this instance the procedure was modified by replacing the Solution A of Example V with Solution D. The solid product was a substantially dry, free-flowing, particulate solid having a tan color. Substantially all of said solid passed a 10 mesh U.S. Standard screen, and solutions of said solid were excellent sequestering agents.

Results substantially identical with those of Examples V and X, supra, have been obtained by evaporating solutions of sodium β-glucoheptonate which were treated with borate sources selected from the group consisting of sodium tetraborate, sodium metaborate, mixtures thereof, and mixtures of at least one member of said group with boric acid.

EXAMPLE XI

A 0.1 gram portion of solid product from Example VI, supra, was dissolved in about 70 milliliters of water and a 3 gram portion of sodium hydroxide was added to the resulting solution to form a solution which was diluted to 100 milliliters and labeled "Solution A." A 0.3 gram portion of metallic aluminum was dissolved in Solution X which was then allowed to stand a first standing period of about 72 hours at about 70° C. in an open container. The volume of the solution was readjusted to 100 milliliters (by adding water) and 0.7 gram portion of aluminum was dissolved therein, and the thus treated solution was allowed to stand for a second standing period of about 24 hours at about 70° C. At the end of this period the solution was clear, free of turbidity and no precipitate could be detected in the container.

EXAMPLE XII

The general procedure of Example X, supra, was repeated; however, in this instance, solid product from Example VI, supra, was omitted (i.e., the sequestering agent was not added). A substantial amount of precipitate was observed in the container at the end of the second standing period.

The components of any solid (whether it be a solid existing in the solid phase per se or a dissolved solid existing in solution) always add up to 100 mole percent. For example, a solid product consisting essentially of about 30 mole percent of borate esters of sodium β-glucoheptonate will also consist essentially of about 70 mole percent sodium β-glucoheptonate—to total 100 mole percent. A solid product consisting essentially of 100 mole percent borate esters of sodium β-glucoheptonate will also consist essentially of zero mole percent sodium β-glucoheptonate—to total 100 mole percent. A dissolved solid consisting essentially of 100 mole percent of said borate esters will contain no free (non-esterified) sodium β-glucoheptonate while a dissolved solid consisting essentially of 75 mole percent of such esters will contain 25 mole percent of free sodium β-glucoheptonate—to total 100 mole percent. Likewise, a dissolved solid consisting essentially of 15 mole percent of such esters will contain 85 mole percent of free sodium β-glucoheptonate—to total 100 mole percent.

The term "particulate," as used herein, means distinct particles; said term, as used herein, carries no connotation concerning the size of such particles.

The term "substantially dry," as used herein, means that a substantially dry material has a moisture ($H_2O$) content of less than about 5 percent by weight.

As used herein, the term "sequestering agent" means a material (or mixture of materials) which will cause the formation of soluble complexes of metal ions in the presence of chemicals that would normally react with, or combine with, said ions to form insoluble products (precipitates).

A sequestering agent, by forming soluble complexes with metal ions, can also dissolve many slightly soluble substances—e.g., $CaSO_4$, $BaSO_4$, and the like.

The composition of the instant invention is especially useful as a complexing or sequestering agent in the alkaline etching of metallic aluminun because, unlike such well known sequestering agents as EDTA and NTA, the composition made by the process of the instant invention is highly effective in preventing the precipitation of $Al_2O_3$ (probably as hydrated aluminum oxide—the so-called aluminum hydroxide) in such alkaline etching baths. Said composition is also an excellent sequestering agent for preventing the formation of precipitates in strongly alkaline baths which are frequently used in washing operations. For example, in washing bottles in the dairy, soft drink and brewing industries, bottles are washed with the use of hot solutions of sodium hydroxide, approximating 3% in strength. As the water used in washing is ordinary tap water containing calcium and magnesium in the amounts present in ordinary water supplies, there is a tendency for precipitates to deposit on both the wash machinery and the bottles being washed. This deposition (milkstone) apparently takes place to the greatest extent in the first rinse tank, where, in customary operation, the pH of the rinse water is about 11.5, sometimes a little below 11.5, more often between 11.5 and 12. Precipitation results in the formation of scale on the machinery, plugging of the spray nozzles and discoloration of the bottles or other objects being washed.

Many sequestering agents, such as the glassy phosphates, tripolyphosphate, NTA (nitrilotriacetic acid or salts thereof), and EDTA (ethylenediaminetetraacetic acid or salts thereof) which are useful in inhibiting the formation of films or precipitates with less alkaline detergents, as, for example, those used in domestic or commercial dishwashers, are ineffective with these more highly alkaline solutions, presumably because of hydrolysis.

The borate source (boric acid, sodium tetraborate, sodium metaborate, and all possible mixtures thereof) can be added to sodium β-glucoheptonate solutions while said borate source is in the solid phase or while said borate source is present as a slurry or as an aqueous solution. However, because of its low solubility in water, it is generally not economically practical to add boric acid in the form of a solution.

All pressures reported in this specification are absolute pressures unless otherwise defined where used.

What is claimed is:

1. A solid composition useful as a sequestering agent, said composition being prepared by a process comprising adding a borate source selected from the group consisting of boric acid, sodium tetraborate, sodium metaborate, and mixtures of at least two members of said group to a first aqueous solution of sodium β-glucoheptonate, said solution analyzing about 30–70% by weight of sodium β-glucoheptonate, said borate source being added at the rate of about 1.62–10.8 grams of boron, calculated as B, per gram mole of said sodium β-glucoheptonate, evaporating the resulting second solution substantially to dryness, and recovering the resulting substantially dry, free-flowing, particulate solid product.

2. A process for preparing a composition useful as a sequestering agent, comprising adding a borate source selected from the group consisting of boric acid, sodium tetraborate, sodium metaborate, and mixtures of at least two members of said group to a first aqueous solution of sodium β-glucoheptonate, said solution analyzing about 30–70% by weight of sodium β-glucoheptonate, said borate source being added at the rate of about 1.62–10.8 grams of boron, calculated as B, per gram mole of said sodium β-glucoheptonate, evaporating the resulting second solution substantially to dryness, and recovering the resulting substantially dry, free-flowing, particulate solid product.

3. The process of claim 2 in which the borate source is added at the rate of about 4–6 grams of boron, calculated as B, per gram mole of sodium β-glucoheptonate.

4. A process for preparing a composition useful as a sequestering agent, said process comprising:
 (a) preparing a first aqueous solution, said first aqueous solution having a first solid content of about 30–70% by weight, by adding a borate source selected from the group consisting of boric acid, sodium tetraborate, sodium metaborate, and mixtures of at least two members of said group to a second aqueous solution, said second aqueous solution having a second solid content of about 20–60% by weight, said second solid consisting essentially of sodium β-glucoheptonate, while agitating said second solution and maintaining the temperature thereof within the range of about 20–100° C., said borate source being added at a rate to provide about 1.62–10.8 grams of boron, calculated as B, per gram mole of sodium β-glucoheptonate present in the second aqueous solution to form a third aqueous solution, and adjusting the solid content of said third aqueous solution to about 30–70% by weight;
 (b) precipitating a solid product by evaporating the aforesaid first aqueous solution substantially to dryness; and
 (c) recovering the resulting solid product, said product being a substantially dry, free-flowing, particulate solid.

5. The process of claim 4 in which the borate source is added at a rate to provide about 2.8–10.82 grams of boron, calculated as B per gram mole of sodium β-glucoheptonate present in the second aqueous solution.

6. The process of claim 4 in which the first aqueous solution is evaporated substantially to dryness by spray drying using an air stream with an inlet temperature of about 150–190° C. and an outlet temperature of about 55–80° C. under a pressure of about 5–15 pounds per square inch absolute.

7. The process of claim 4 in which the first aqueous solution is evaporated substantially to dryness by heating to about 50–115° C. in a rotary dryer under a pressure of about 1–15 pounds per square inch absolute.

8. The process of claim 6 in which the evaporation is conducted using an inlet air temperature of about 170–180° C. and an air outlet temperature of about 60–70° C. under a pressure of about 1 atmosphere.

9. The process of claim 7 in which the evaporation is conducted at about 90–110° C. under a pressure of about 7–12 pounds per square inch absolute.

10. The process of claim 4 in which the borate source is added at a rate to provide about 4–6 grams of boron, calculated as B per gram mole of sodium β-glucoheptonate.

References Cited
UNITED STATES PATENTS

| | | | |
|---|---|---|---|
| 3,039,970 | 6/1962 | Krueger et al. | 252—156 XR |
| 3,217,034 | 11/1965 | Karabinos et al. | |
| 3,105,822 | 10/1963 | Karabinos et al. | 252—156 |

JOHN T. GOOLKASIAN, Primary Examiner

M. E. McCAMISH, Assistant Examiner

U.S. Cl. X.R.

252—156; 260—234